US009035235B2

(12) United States Patent
Bockelmann et al.

(10) Patent No.: US 9,035,235 B2
(45) Date of Patent: May 19, 2015

(54) METHOD FOR REDUCING INTERFERENCE AND CROSSTALK IN DOUBLE OPTICAL TWEEZERS USING A SINGLE LASER SOURCE, AND APPARATUS USING THE SAME

(75) Inventors: Ulrich Bockelmann, Paris (FR); Pierre Mangeol, Abreschviller (FR)

(73) Assignee: CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 13/055,130

(22) PCT Filed: Jul. 22, 2009

(86) PCT No.: PCT/EP2009/059428
§ 371 (c)(1),
(2), (4) Date: Apr. 7, 2011

(87) PCT Pub. No.: WO2010/010121
PCT Pub. Date: Jan. 28, 2010

(65) Prior Publication Data

US 2011/0174962 A1 Jul. 21, 2011

Related U.S. Application Data

(60) Provisional application No. 61/135,620, filed on Jul. 22, 2008.

(51) Int. Cl.
*H01S 1/00* (2006.01)
*G21K 1/00* (2006.01)

(52) U.S. Cl.
CPC .................................... *G21K 1/006* (2013.01)

(58) Field of Classification Search
USPC .......................................................... 250/251
See application file for complete search history.

(56) References Cited

U.S. PATENT DOCUMENTS 5,512,745 A * 4/1996 Finer et al. .................... 250/251
6,180,940 B1 * 1/2001 Galstian ........................ 250/251

(Continued)

OTHER PUBLICATIONS

Visscher, Construction of Multiple-Beam Optical Traps with Nanometer-Resolution Position Sensing, Dec. 1996, IEEE Journal of Selected Topics in Quantum Electronics, vol. 2, pp. 1066-1076.*

(Continued)

*Primary Examiner* — Jack Berman
*Assistant Examiner* — Jason McCormack
(74) *Attorney, Agent, or Firm* — Blakely Sokoloff Taylor & Zafman

(57) ABSTRACT

Experimental studies of single molecule mechanics require high force sensitivity and low drift, which can be achieved with optical tweezers through an optical tweezers apparatus for force measurements. A CW infrared laser beam is split by polarization and focused by a high numerical aperture objective to create two traps. The same laser is used to form both traps and to measure the force by back focal plane interferometry. Although the two beams entering the microscope are designed to exhibit orthogonal polarization, interference and a significant parasitic force signal occur. Comparing the experimental results with a ray optics model, the interference patterns are caused by the rotation of polarization on microscope lens surfaces and slides. Two methods for reducing the crosstalk are directed to polarization rectification by passing through the microscope twice and frequency shifting of one of the split laser beams.

5 Claims, 9 Drawing Sheets

(56) References Cited

U.S. PATENT DOCUMENTS

| | | | | |
|---|---|---|---|---|
| 2004/0090632 | A1* | 5/2004 | Dholakia et al. | 356/450 |
| 2006/0163465 | A1* | 7/2006 | Kuzmich et al. | 250/251 |

OTHER PUBLICATIONS

Relation Between Frequency and Power, Aug. 13, 3010, CrazyEngineers, <http://www.crazyengineers.com/threads/relation-between-frequency-and-power.35784/>.*

Topic 2, C. Sethuraman, Energy Manager Training, <http://www.energymanagertraining.com/did/05/sethuraman05_T2.pdf>.*

Planck's Constant, Encyclopaedia Britannica, 2013, <http://www.britannica.com/EBchecked/topic/462917/Plancks-constant>.*

Power (physics), Wikipedia, <http://en.wikipedia.org/wiki/Power_(physics)>.*

Visscher et al. Construction of Multiple-Beam Optical Traps with Nanometer-Resolution Position Sensing, Dec. 1996, Journal of Selected Topics in Quantum Electronics, pp. 1066-1067.*

Kemp, Polarized Light and its Interaction with Modulating Devices—a Methodology Review, 1987, Hinds International Inc.*

Visscher et al., Construction of Multiple-Beam Optical Traps with Nanometer-Resolution Position Sensing, 1996, IEEE Journal of Selected Topics in Quantum Electronics, vol. 2, No. 4.*

Allersma et al., Two-Dimensional Tracking of ncd Motility by Back Focal Plane Interferometry, Feb. 1998, Biophysical Journal, vol. 74, pp. 1074-1085.*

M. Capitanio et al., Position Control and Optical Manipulation for Nanotechnology Applications, The European Physical Journal B, Condensed Matter Physics, EDP Sciences, Jul. 1, 2005, vol. 46, pp. 1-8.

P. Mangeol et al., Probing DNA and RNA Single Molecules with a Double Optical Tweezer, The European Physical Journal E, Societa Italiana Di Fisica, Mar. 1, 2006, vol. 19, pp. 311-317.

A. Fontes et al., Measuring Electrical and Mechanical Properties of Red Blood Cells with Double Optical Tweezers, Journal of Biomedical Optics Spie—International Society for Optical Engineering USA, Jan. 2008, vol. 13, pp. 014001-1-014006.

* cited by examiner

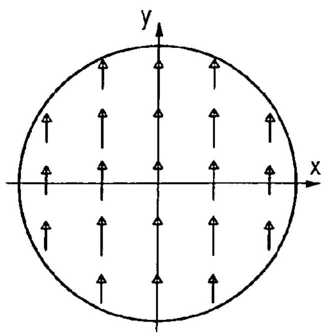
FIG. 2a
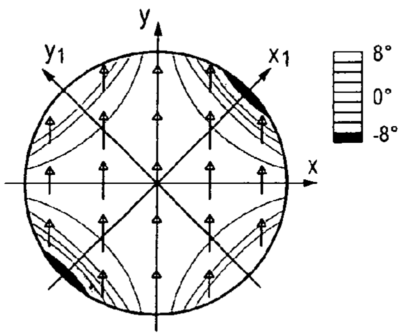
FIG. 2b
FIG. 2c
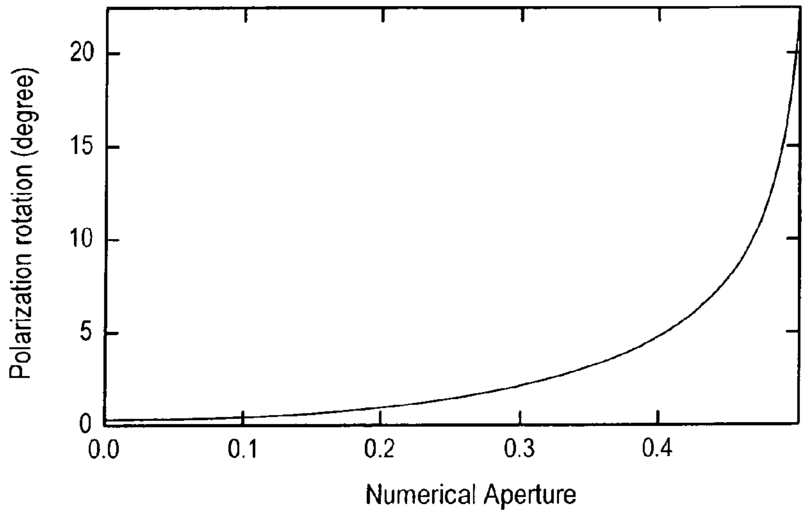
FIG. 2d
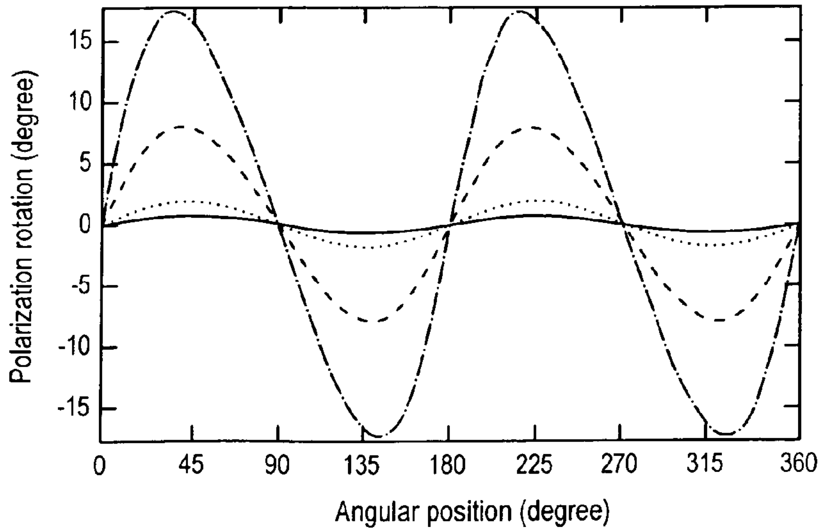

METHOD FOR REDUCING INTERFERENCE AND CROSSTALK IN DOUBLE OPTICAL TWEEZERS USING A SINGLE LASER SOURCE, AND APPARATUS USING THE SAME

This is a non-provisional application calming the benefit of U.S. Provisional Application No. 61/135,620, filed Jul. 22, 2008, and International Application No. PCT/EP2009/059428, filed Jul. 22, 2009.

TECHNICAL FIELD

The invention relates to a method for reducing or minimizing interference and/or crosstalk that may appear in an apparatus comprising a double optical tweezers using a single laser source.

BACKGROUND OF THE INVENTION

Optical tweezers have been used over the two past decades to probe biological objects of various sizes, from whole cells down to individual proteins. Force measurement devices based on double optical tweezers have initially been used to manipulate non spherical particles such as bacteria, and increasingly became an important tool for single molecule studies of nucleic acids, and their interactions with proteins.

An important feature of double optical tweezers derived from a single laser source is that, although the absolute position of each trap is sensitive to external mechanical perturbations, their relative position can be precisely imposed. Beam steering may be achieved with galvanometer, piezoelectric tilt mount or acousto-optic deflectors. The force acting on one bead is often measured with the back focal plane method, which allows decoupling the force signal from trap displacement, and hence external vibrations. The two traps usually exhibit perpendicular polarization in order to reduce interference as well as to easily discriminate between them for detection. A laser of different wavelength can be used for detection, but a parasitic signal may then arise from the relative drift between the trapping and detection lasers.

When one of the two trapping beams is used for force measurement, it has to be distinguishable from the second beam of the double trap. Orthogonal polarizations can be used for this purpose. However, when linearly polarized light goes through a system of microscope objectives, such as in an optical tweezers apparatus, it suffers form the rotation of polarization, resulting in a non homogeneous polarization when it exits the microscope. Consequently, important crosstalk may occur when force is measured in this configuration. This crosstalk limits the force resolution of the force measurements.

SUMMARY OF THE INVENTION

It is an objective of the invention to provide a method that reduces the occurring crosstalk in force measurements using double optical tweezers with a single laser source.

In one embodiment, this objective is achieved by a method according to the invention that rectifies the polarization by going through the microscope lens and the condenser twice and compensating rotation of the polarization by a quarter-wave plate.

In another embodiment, the objective is also achieved by a method according to the invention that shifts the frequency of one of the two beams issued from the single laser source with an acousto-optic frequency shifter.

The invention concerns also a double optical tweezers apparatus implementing at least one of the preceding methods.

BRIEF DESCRIPTION OF THE DRAWINGS

FIGS. 2*a-d* show rotation of polarization of a Gaussian beam passing the two lens systems of FIG. 1.

DETAILED DESCRIPTION OF THE INVENTION

In a first part, we are going to discuss the rotation of polarization in a microscope. Conventional polarizing microscopy suffers from the rotation of polarization on lens surfaces or slides, which results in a loss of contrast when imaging a sample. A simple explanation of the rotation of polarization can be given as follows. For a linearly polarized beam refracting on the surface of a lens, the electric field exhibits different parallel and perpendicular components relative to the plane of incidence, depending on the position on the lens. Since, according to the Fresnel equations, the two components are refracted differently, the polarization of the total electric field is rotated. As described in more detail in the following description, this effect induces difficulties when detecting force with double optical tweezers.

Figure 1:
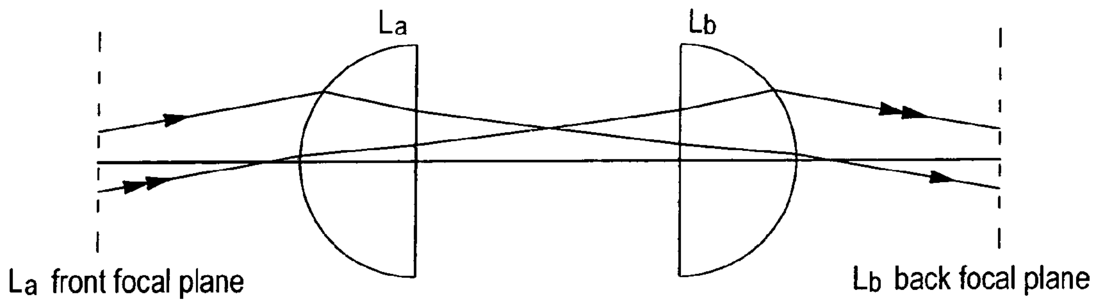
FIG. 1 shows ray propagation through a two lens system.

For sake of simplicity, the propagation of light is described in a simple model, to give a qualitative understanding of the effects coming from the rotation of polarization in optical tweezers. These effects are of general validity for centered systems, and the main results regarding field symmetry are the same for complex objectives. As shown in FIG. 1, the trapping objective and the condenser collecting light from a trapped particle are modeled by two plano-convex lenses ($L_a$ and $L_b$), faced front to front. We assume a radius $r_L$, of the two plano-convex lenses and a glass refractive index $i_{GR}$. The two lenses are identical, centered on the same axis and the back focal plane of the first lens coincides with the front focal plane of the second lens. The Gaussian beam entering this two lens system is supposed to be parallel, linearly polarized (as shown in FIG. 2*a*, incident electric field) and refracting according to the Fresnel equations. Propagation of light is described in the limit of ray optics and spherical aberration is neglected.

The electric field occurring in the back focal plane of the second lens $L_b$ is presented in FIG. 2*b*. Polarization is rotated, except for the x and y axes, which are perpendicular to the optical axis and respectively perpendicular and collinear to the incident polarization. In FIG. 2*b*, the lines of the contour plot correspond to rotation of polarization of −8°, −6°, 4°, −2°, 2°, 4°, 6° and 8°, and gray scales are used to facilitate visualization. The $x_1$ and $y_1$ axes are the first and the second bisecting lines.

For a given direction in the back focal plane starting from the center, the magnitude of the rotation of polarization increases with numerical aperture (as shown in FIG. 2*c*, illustrating the rotation of polarization of the electric field exiting from the two lens system on the $y_1$ axis for $y_1>0$). For a given radius, the rotation is stronger when the electric field exhibits similar parallel and orthogonal components according to the incidence plane on the lenses. Maximum values are reached close to the $x_1$ and $y_1$ axes, but not exactly on these axes, depending on numerical aperture (see FIG. 2*d* showing the rotation of polarization of the electric field exiting from the two lens system on the perimeter of N.A.=0.20 (solid), N.A.=0.30 (dotted), N.A.=0.45 (dashed) and N.A.=0.49 (dash-dotted).).

Figure 3:
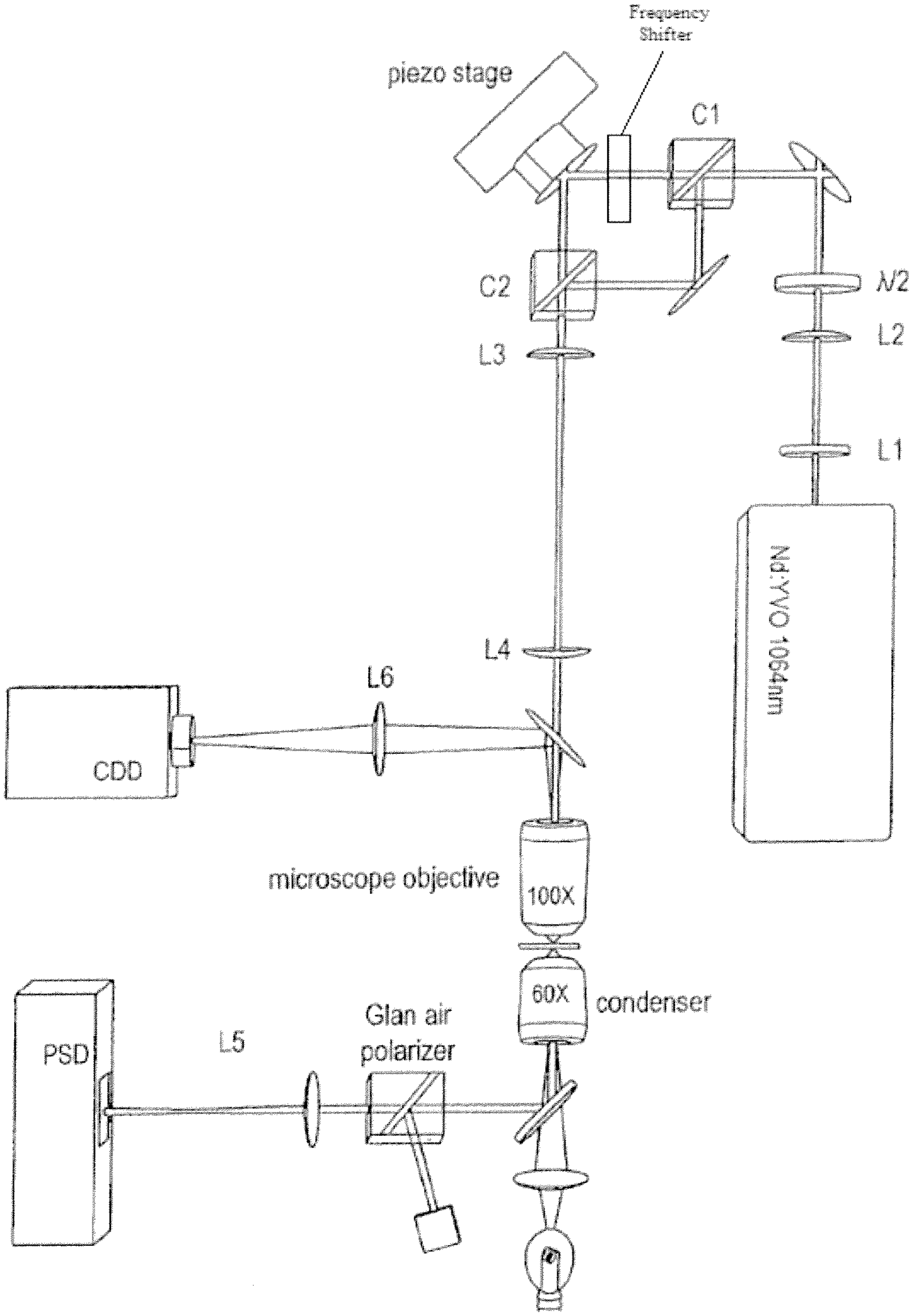
FIG. 3 shows a schematic layout of a double optical tweezers apparatus according to the invention.
Figure 4:
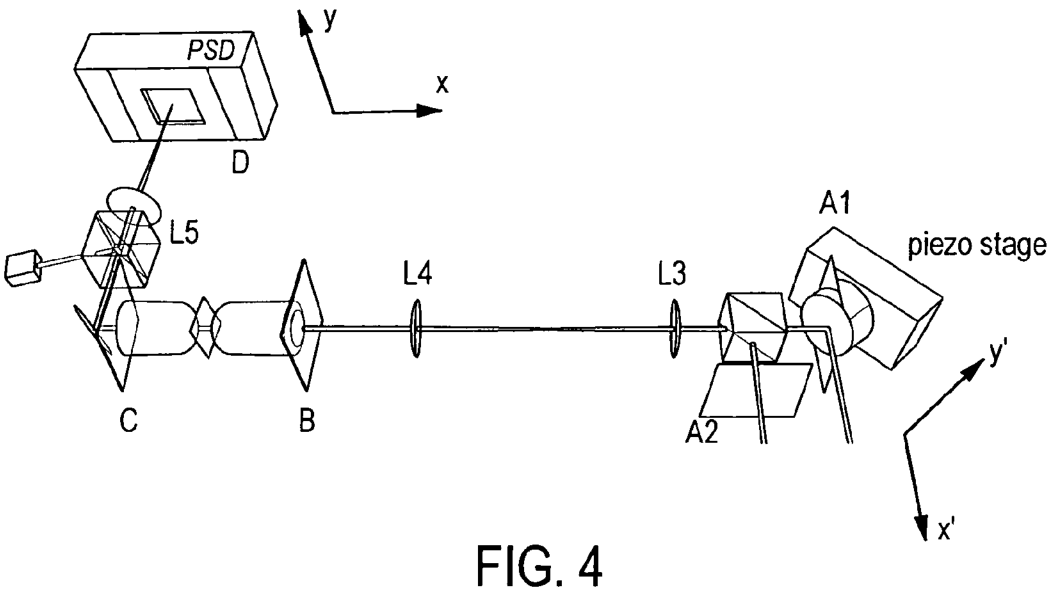
FIG. 4 shows a schematic layout of the microscope part.

In reference to FIGS. 3 and 4, we are going to describe a double optical tweezers apparatus according to the invention. The apparatus of FIG. 3 is based on a custom-designed inverted microscope. For optical trapping and force detection, the apparatus comprises, here, a CW linearly polarized diode pumped Nd:$YVO_4$ laser (1.064 μm, 10 W). The laser beam is first expanded through a beam expander comprising two lenses (L1 and L2). Then, in order to create two independent traps, the laser beam is split by polarization by the combination of a half-wave plate (λ/2) and a first polarizing cube beamsplitter (C1). The direction of one of the two beams is varied by a piezoelectric mirror mount with integrated position sensor operating in feedback loop (piezo stage on FIG. 3). After recombination with a second polarizing cube beamsplitter (C2), the two beams exhibit perpendicular polarization and their directions are slightly tilted to obtain two separate traps. Lenses (L3) and (L4) form a beam steering and image the center of the mirror mounted on the piezoelectric stage on a back focal plane of a trapping objective (microscope objective on FIG. 3). The beams are then collimated by a second objective (condenser on FIG. 3). Finally, a Glan-laser polarizer reflects one of the two beams, and a lens (L5) images the back focal plane of the second objective on a position sensitive detector (PSD). As it can be seen on FIG. 3, a part of the optical path of the apparatus according to the invention is also used to image the sample on a CCD camera. In order to avoid fluctuations from air currents, the optical path is fully enclosed. Most mechanical parts are designed to reduce drift and vibration. In variant, any other suitable polarizer can be used in place of the Glan-laser polarizer.

Force measurements in optical tweezers generally use either laser light going through the particle or bead, trapped by the first objective, for interferometric position detection or white light illumination for video based detection. The apparatus according to the invention uses back focal plane interferometry to measure the force. The method implemented consists in evaluating the pattern of laser light diffracted by one of the trapped beads in the back focal plane of the condenser (or second objective) by imaging the pattern on a four-quadrant photodiode or any other suitable position sensitive detector (PSD).

As the two beams entering the trapping objective are of perpendicular polarization, if one wants to separately detect the position of one of the beads in its trap, one has to split by polarization the beams used to trap. Since a linearly polarized beam suffers from a non homogeneous rotation of polarization when going through the optical components of a microscope, the discrimination of the two beams according to polarization cannot be perfectly achieved. If the polarization of one beam is checked after the back focal plane of the second objective with the polarizer, it can be observed that the transmitted light pattern exhibiting a polarization perpendicular to the incident beam is cross-shaped, in agreement with the calculation presented in FIG. 2*b*. Consequently, the rotation of polarization allows for interference between the two beams, and the crosstalk that occurs is not simply the sum of the signals coming from the two beams separately.

To understand the interference pattern appearing in the back focal plane of the second objective, we use the model of FIG. 1. For the sake of simplicity, we restrict the theoretical study to the case where no bead is trapped.

To describe the interference pattern, we need to know the amplitudes and phases of the two beams in the detector plane. For this purpose, we now closely consider the microscope and detection part of the apparatus (see FIG. 4) and in particular image planes (A1), (A2), (B), (C) and (D).

The back focal plane (C) of the second objective is conjugated with the detector plane (D). The back focal planes, (B) and (C), of the two objectives are also conjugated, and finally the lenses (L3) and (L4) conjugate the back focal plane (B) of the trapping objective with plane (A1) centered on the mirror mounted on the piezoelectric stage for the first beam (directed by x' and y' axes) and with the equally distant plane (A2) on the other path for the second beam. Planes (A1) and (A2) are consequently conjugated with the detector plane (D).

Figure 5:
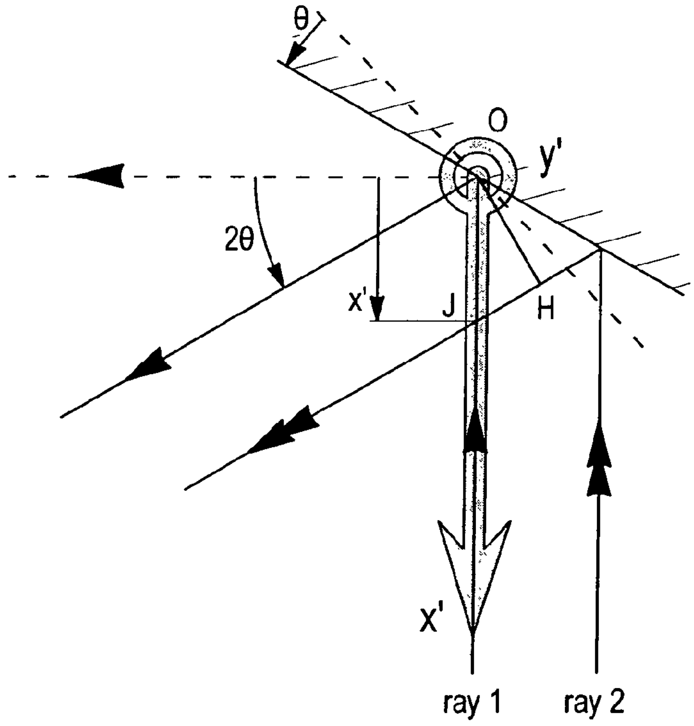
FIG. 5 illustrate geometric parameters describing the deflection of the mobile trap by a piezoelectric mirror mount into the apparatus of FIGS. 3 and 4.

When the traps overlap, the beams enter the microscope with exactly the same angle. The phase shift $\Delta\phi_A$ between the phases of planes (A1) and (A2), respectively $\Delta\phi_{A1}$ and $\Delta\phi_{A2}$, is constant on the plane (A1), so that $\Delta\phi_A=\Delta\phi_{A1}-\Delta\phi_{A2}=\phi_0$. This phase shift depends on the relative length of the optical paths of the two beams and is difficult to avoid because it corresponds to subwavelength (i.e. submicrometer) displacements of the optical components and is therefore particularly sensitive to thermal drift. To separate the two traps, one has to tilt the mirror mounted on the piezoelectric stage by an angle θ around the y' axis. If the rotation axis is centered on the optical path, and if $\theta<<1$, and as the beam is parallel, its phase is constant on any plane perpendicular to its direction of propagation, and in particular its phase is constant on segment [OH] (See FIG. 5). As O is on the rotation axis of the mirror, the phase of ray 1 reflecting on O is constant on the plane (A1) with the deflection of the beam. In comparison to ray 1, the ray 2 passing on point J, of abscissa x', has the additional path [HJ]=2θ x' before hitting plane (A1), so that its phase is $\phi_{A1}(x',\theta)=\phi_{A1}(0,\theta)+2\theta x'2\pi/\lambda$. Finally, as the phase on plane (A2) is still constant, the phase shift between the planes (A1) and (A2) is the corresponding phase shift takes the simple form $$\Delta\phi_A(x',\theta)=\phi_0+\frac{4\pi}{\lambda}\theta x'$$

where λ is the light wavelength.

Assuming that the magnification between planes (A1 and A2) and the detector plane (D) is α, the phase shift between the two beams in the plane (D) is given by $$\Delta\phi_D(x,\theta) = \phi_0 + \frac{4\pi}{\lambda\alpha}\theta x$$

The amplitude and phase of light going through two real microscope objectives may be difficult to calculate and requires knowledge of curvature, material and coating of each element. The field symmetry should nevertheless be identical to the simpler case illustrated by FIG. 1. Thus we use the model of FIG. 1 to describe the field amplitudes of the two beams on plane (D) and to evaluate the components that are transmitted by the polarizer.

As the phase shift between the two beams and their respective field amplitudes are given, we can describe the interference pattern occurring on the detector plane (D). We consider the specific and most useful case in which the polarizer after the second objective is rotated to reject the maximum of light coming from the moving trap. The vectors $\vec{\epsilon}_1=\vec{E}_1e^{i\omega t}$ and $\vec{\epsilon}_2=\vec{E}_2e^{i\omega t}$ denote the electric fields in the detector plane of the light coming from the fixed and mobile trap respectively. The light intensity $I=\epsilon_0 c\langle|\vec{\epsilon}_1+\vec{\epsilon}_2|^2\rangle$ on the detector is given by $$I(x,y,\theta)=\epsilon_0 c\left(|\vec{E}_1(x,y,\theta)|^2+|\vec{E}_2(x,y,\theta)|^2+2\vec{E}_1(x,y,\theta).\vec{E}_2(x,y,\theta).\cos(\Delta\phi_D(x\theta))\right) \quad (1)$$

The sum of the first two terms of equation (1) describes roughly the amplitude of a Gaussian beam, and we rewrite it as $$\epsilon_0 c\left(|\vec{E}_1(x,y,\theta)|^2+|\vec{E}_2(x,y,\theta)|^2\right)=A(x,y,\theta)$$

If the optical components are perfectly centered and the two Gaussian beams impinge on the center of the back focal plane of the trapping objective, the symmetry of the system implies that A (x,y,θ)=A(x,−y,θ). However, when θ≠0, the rotation of polarization on the mobile trap is no more symmetrical regarding the x>0 and x<0 halves. As shown in FIG. 1, when the beam is refracted from air to the spherical interface of ($L_a$) the upper ray is refracted by a wider angle than the lower one. When the beam is refracted from the spherical interface of ($L_b$) to air, what used to be the upper ray of the beam is now refracted by a smaller angle than what used to be the lower one. Because Fresnel coefficients differ when light is refracted from air to glass and glass to air, even if the paths of the two rays are symmetrical, the rotation of polarization that the two rays endure is not identical after passing through the two lenses. As a result, except for a few points, A(x,y,θ)≠A (x,y,θ).

The last term of equation (1) creates interference, and we rewrite it as $$\epsilon_0 c\left(2\vec{E}_1(x,y,\theta).\vec{E}_2(x,y,\theta).\cos(\Delta\phi_D(x,\theta))\right)=B(x,y,\theta)$$

Once more, if alignment is perfect, the symmetry of the system implies that B(x,y,θ)=−B(x,−y,θ). On the other hand, because the refraction is asymmetrical as described above, except for a few special points, B(x,y,θ)≠B(−x,y,θ).

Figure 6:
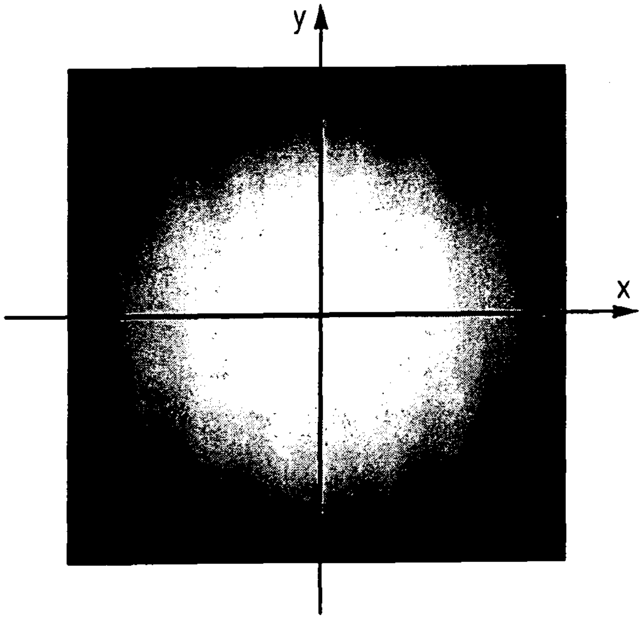
FIG. 6 shows an interference pattern in a back focal plane of the second objective of the apparatus of FIGS. 3 and 4.

The illumination calculated assuming perfect alignment is shown in FIG. 6 (this figure is obtained for an angular difference between the two beams of 1 mrad and a numerical aperture of 0.47). The fringes are parallel to the y axis, and in each quarter, the distance between neighboring maxima equals αλ/2θ. The contrast of the fringes increases with the absolute rotation of polarization and contrast inversion appears when going from left to right and from top to bottom due to the relative direction of the electric fields.

To calculate the expected normalized output signal of the position sensitive detector, we subtract the illumination on the x>0 half by the one on the x<0 half and divide this difference by the total illumination. When we increase the angle between the two beams, the system symmetry implies that the fringes have no effect on the detector signal, only the asymmetric refraction leads to a linear dependence of the signal on the angular position (for 2.5 mrad, the normalized difference reaches $-5\times10^{-6}$).

Figure 7:
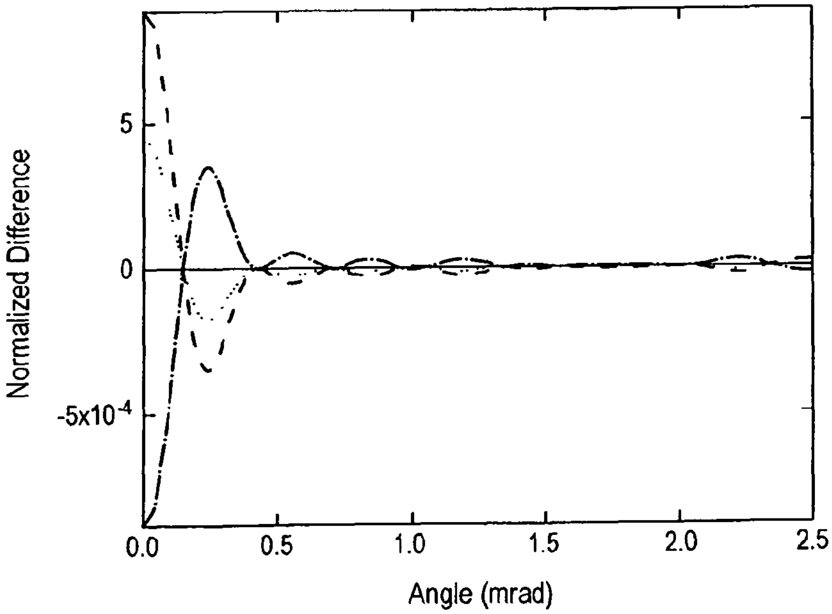
FIG. 7 illustrates theoretically expected normalized output signal of a position sensitive detector in the presence of the two beams when the mobile beam is deflected and given N.A.

In practice, the beams can be aligned to a precision of a few micrometers. To illustrate the consequence of this limitation, we now consider the case where one of the two beams is slightly translated from its centered position. As a typical example, if the beam creating the fixed trap is translated by 5 μm along the y axis in the back focal plane (B) of the trapping objective, the image on the detector plane still looks close to the perfectly aligned case. The signal coming out of the detector is however very different as shown in FIG. 7. In this FIG. 7, it is shown the theoretically expected normalized output signal of a position sensitive detector in the presence of the two beams when the mobile beam is deflected and N.A.=0.47. The fixed trap is translated by +5 μm along the y axis in the detector plane (D). The phase difference $\phi_0$ between the two beams is 0 (dashed), π/3 (dotted), π/2 (solid) and π (dash-dotted).

The magnitude of the parasitic signal is higher, increases with the translation of the beam (data not shown) and shows a dependence on the phase shift $\phi_0$ The variation of the signal when the traps move apart is closely linked to the appearance of new fringes on the detector plane. As a result, the parasitic signal takes a complicated form, depending on misalignments and numerical apertures.

Figures 8A, 8B, 8C:
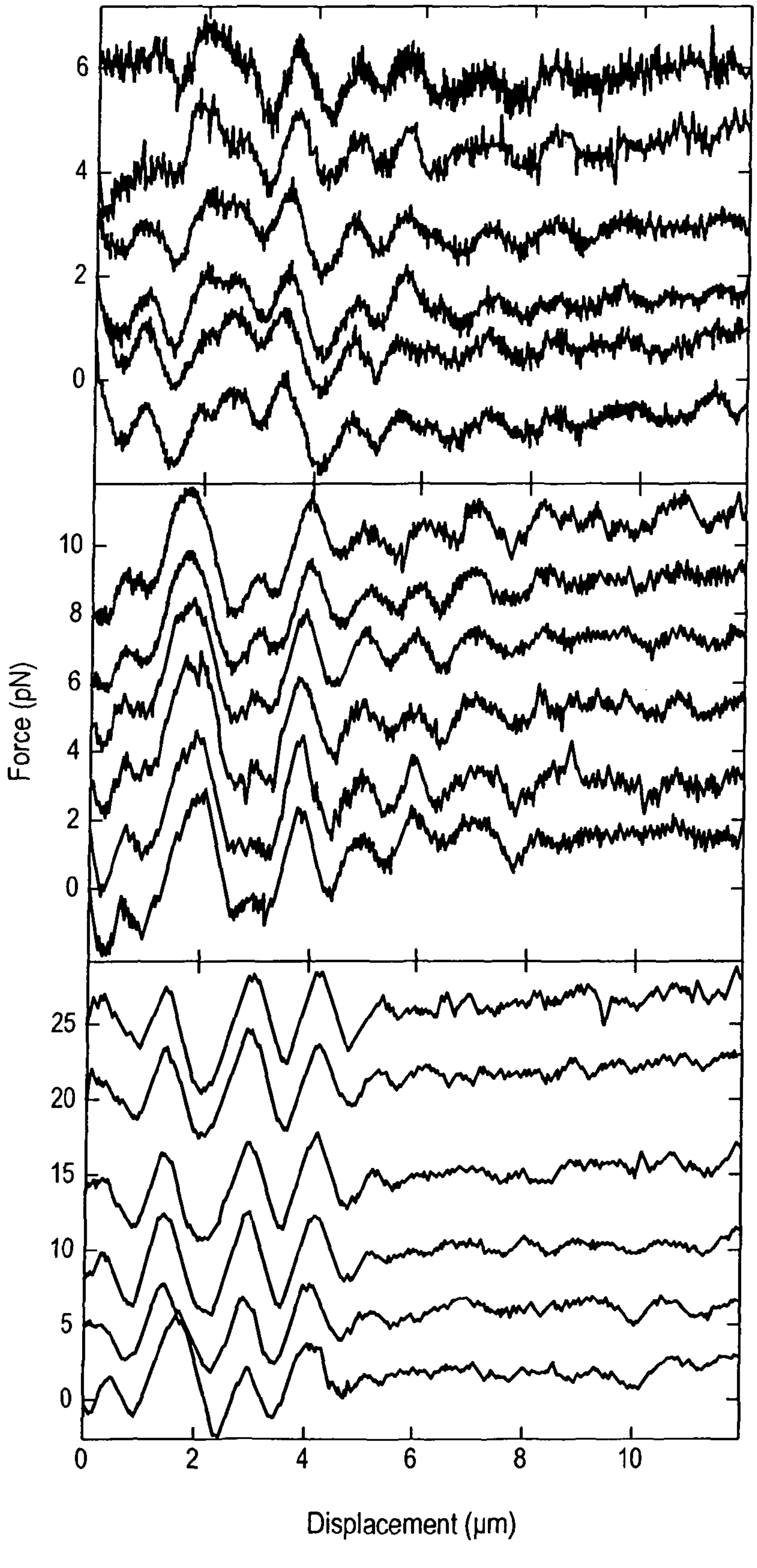
FIG. 8 illustrates dependence of the parasitic signal on the stiffness and the separation between the two traps.

In order to evaluate the crosstalk occurring during a force measurement, we assume that we trap two beads in the two optical tweezers, one bead is fixed and the other one is moved apart such as in a single molecule experiment. The force is measured on the bead in the fixed trap. Force is calibrated by measuring the power spectrum of the Brownian motion of a trapped bead with a spectrum analyzer. Exciting separately the mobile or the fixed trap and selecting the corresponding polarization in the detection path, we measured the stiffness of each trap of the double tweezers. The difference between these two stiffness is below 5%, an uncertainty comparable to the one caused by common bead to bead variation. When the two beads are separated by a few micrometers in the sample, the observed light interference pattern exhibits the characteristics previously described theoretically. Force measurements resulting from the evaluation of the light pattern on a position sensitive detector (PSD) are done at different laser powers; we measure a few curves for each power to illustrate the effect of drift on the signal (see FIGS. 8 *a*, *b* and *c*). In FIG. 8, dependence of the parasitic signal on the stiffness and the separation between the two traps are illustrated. In these examples, the force is measured on the fixed trap using two unlinked beads. The stiffness $k_f$ of the fixed trap and the total laser power in the back focal plane of the trapping objective P are (a) $k_f$=192 pN/μm, P=800 mW (b) $k_f$=339 pN/μm, P=1.40 W (c) $k_f$=593 pN/μm, P=2.05 W. The displacement velocity between the two traps is 1 μm/s and sampling is done at 800 Hz with an anti-alias filter of 352 Hz. Individual curves are vertically shifted for clarity (1.5 pN between subsequent curves in (a), 2 pN in (b), 4 pN in (c)). Notice the change in vertical axis scaling between (a), (b) and (c).

The interference pattern creates a parasitic signal which magnitude decreases when the distance between the beads increases, and is approximately proportional to laser power. Actually, when the back focal plane method is used to measure force, one easily finds that force is proportional to the difference of illumination on the two detector halves. Consequently, the output voltage of the detector is commonly proportional to the force regardless of laser power, while a given interference pattern generates a signal proportional to the laser power. The pattern of the signal is difficult to reproduce because it depends on alignments and is subject to drift.

Apparatus alignments are an important issue that should be considered carefully. First, to ensure that the number of fringes is equal for x>0 and x<0, the phase shift between the two beams must be adjusted. One way to adjust the phase is to add a parallel glass slide in the path of one of the beams before they are combined. A rotation of the glass slide will add a phase for this beam until the number of fringes is exactly the same for both detector halves. This rotation also adds a small translation of the beam, but it is possible to keep the translation small enough to not increase significantly the parasitic signal. Second, the image of the center of rotation of the mirror mounted on the piezoelectric stage has to be exactly in the center of the detector to assure the symmetry of the pattern when rotating the mirror. Finally, as it has already been pointed out in the previous paragraph, the beams should be centered on the back focal planes (B, C) of both objectives, and the back focal plane (C) of the second objective should be centered on the detector plane (D).

Figure 9:
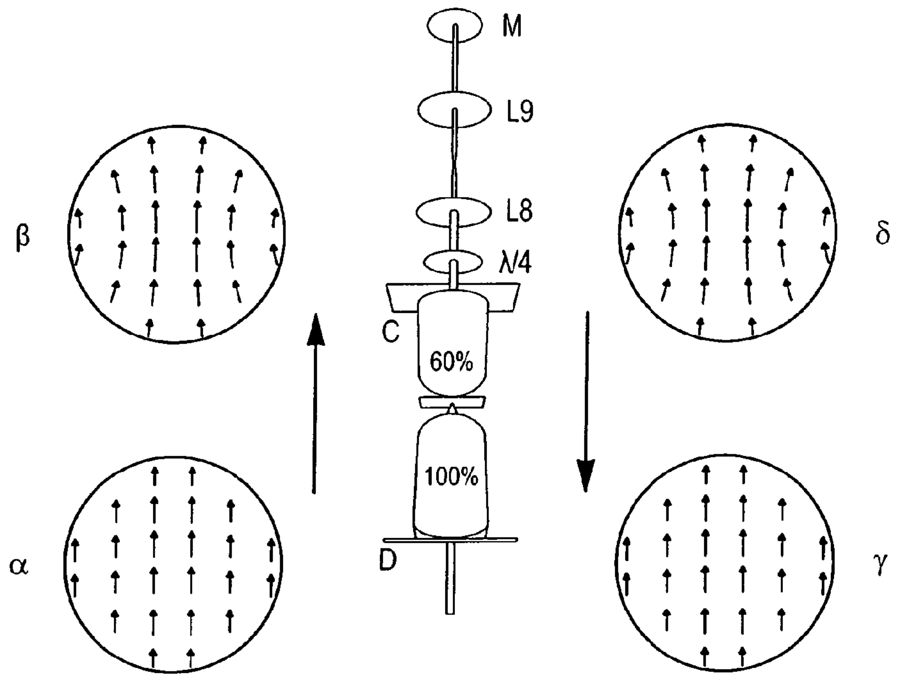
FIG. 9 shows a schematic layout of a polarisation rectifier in an embodiment of the apparatus according to the invention.

According to one embodiment of the invention, as the interference originates from the rotation of polarization in the microscope, the method for reducing crosstalk comprise a step of reducing the rotation. This step consists in going through the microscope twice, particular through the trapping objective and second objective, and compensating rotation of polarization by a quarter-wave plate. A schematic layout is given in FIG. 9.

Let us consider a linearly polarized Gaussian beam entering the system (α). When it passes the two objectives the first time, the electric field endures a first transformation due to rotation of polarization (β). The beam is reflected in the upper part of the rectifier and passes twice through the quarter-wave plate. This adds twice the opposite initial rotation (γ). Finally, when the beam goes through the microscope the second time, it again endures the initial transformation (δ). As the electric field is rotated twice by the same angle and once by the double opposite angle, the electric field going out of the polarization rectifier is theoretically perfectly linearly polarized. It remains to detect the bead position by back focal plane interferometry, requiring imaging the light pattern of the back focal plane of the second objective (β) with a corrected polarization. The rectifier comprises a combination of the lenses (L8), (L9) and the mirror (M) that enables us to image the plane (C) on itself, and as planes (C) and (D) are conjugated, the light pattern used for detection (β) is finally seen on plane (D). As the polarization is corrected with the rectifier, the light pattern on plane (D) is appropriate for back focal plane interferometry.

However, some critical points have to be mentioned concerning this embodiment. First, by going back in the microscope, the beams create replicated tweezers that should not perturb the trapping ones. In our configuration it is possible to align the beams going first in the microscope on the optical axis, and then to tilt as less as possible the mirror (M) so that replicated tweezers are far enough to not disturb the trapping tweezers. Second, when the beams are entering the microscope the first time, a significant part of the light is reflected on surfaces, and especially by the glass water interfaces. This generates reflected beams that may be difficult to separate from the ones we want to detect. Third, as the beams are trapping beads only when they first go through the microscope, but not when they go back, paths are different in the two directions. Finally, because Fresnel coefficients are different when light is refracted from glass to air and air to glass interfaces, the rotation of polarization is different when a beam passes through an objective with opposite directions on the same path. As a result, the rotation of polarization may be the same when going through the microscope with opposite direction only if the trapping objective and the condenser are identical. If it is not the case, the transformation may not be perfectly achieved.

During experimentation, using the trapping objective described above and a high N.A. oil immersed objective as a collimation objective (100×/1.3 oil, EC Plan-NeoFluar; Carl Zeiss, Thornwood, N.Y.), this method permits us to decrease crosstalk by a factor of four. The power ratio of the two perpendicularly polarized beams measured with the Glan-laser polarizer is $4\times10^{-3}$ without the rectifier and $1\times10^{-3}$ when it is used at N.A.=1.3. The method appears to be better suited when high N.A. is used. An improvement of below two is found at N.A. lower than 0.9.

According to another embodiment of the invention, a second method to reduce the crosstalk coming from interference comprises a step of shifting the frequency of one of the two beams. This step of frequency shifting can be realized by different means, for instance by acousto-optic or electro-optical devices. In our apparatus, the beam of the mobile trap goes through an acousto-optic frequency shifter before being deflected by the piezoelectric tilt stage. In this way, as one retrieves the first order of the acousto-optic device, the beam coming from the mobile trap is shifted by the acoustic frequency $f_0$ of the shifter.

The intensity on the detector plane is now $$I(x,y,\theta)=\epsilon_0 c\left(|\vec{E}_1(x,y,\theta)|^2+|\vec{E}_2(x,y,\theta)|^2+2\vec{E}_1(x,y,\theta).\vec{E}_2(x,y,\theta).\cos(2\pi f_0 t+\Delta\phi_D(x,\theta))\right)$$

Figure 10:
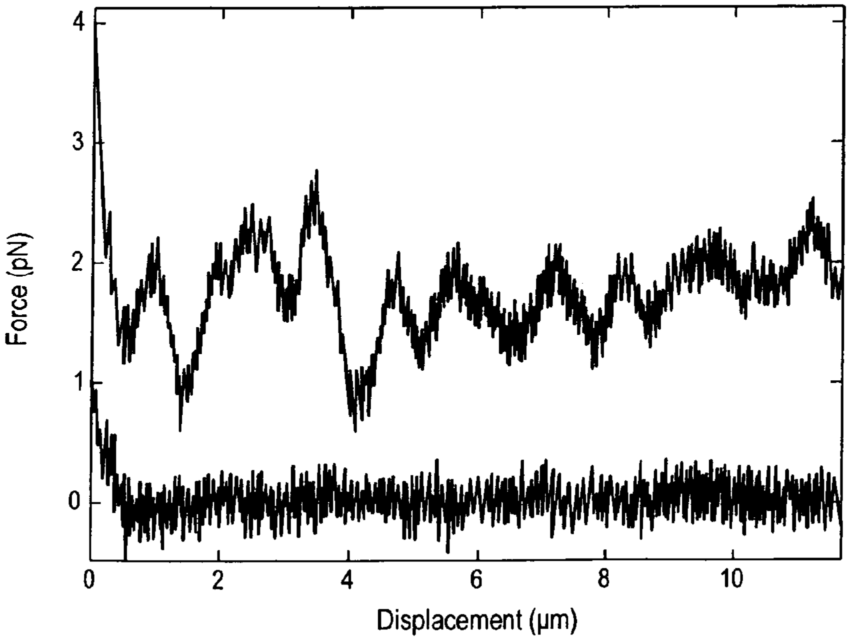
FIG. 10 illustrate the forces measurements with two beads trapped in another embodiment of the apparatus according to the invention comprising a frequency shifter.

The electronics of the position sensitive detector has a bandwidth much smaller than the acoustic frequency $f_0$ of the shifter. The signal coming from the rapidly moving fringes is therefore rejected by the electronics and crosstalk coming from the interference pattern is no more measurable. In our experimentations, $f_0$ was about 80 MHz and the bandwidth of the position sensitive detector was about 100 kHz. FIG. 10 provides an example of force measurements done with and without the frequency shifter. The signal measured with the frequency shifter shows no dependence on the bead separation, except for the first 600 nm where the proximity of the beads affects detection. In these examples, the force measurements were done with two 0.97 μm silica beads trapped with the frequency shifter on (bottom; $k_f$=213 pN/μm, P=910 mW) and off (top; $k_f$=192 pN/μm, P=800 mW). The displacement velocity between the two beads is 1 μm/s, and sampling is done at 800 Hz with an anti-alias filter of 352 Hz. The signal measured without the frequency shifter on is shifted vertically for better visualization.

While frequency shifting indeed enables us to average out interference effects, one should remember that rotation of polarization still occurs and two beams are seen on the detector plane. We did the following experiment to estimate the influence of the mobile trap on the detection of force in the fixed trap. The conversion coefficient which relates force to the output voltage of the detector was determined by measuring the power spectrum of the Brownian motion of one 0.97 μm silica bead in its trap. This measurement was done separately for the two traps (the other trap was switched off during the measurement). The laser light from the mobile trap was reflected with the polarizer. From these measurements we estimated that the conversion coefficient for the fixed trap was 0.26 V/pN and $5.4\times10^{-3}$ V/pN for the mobile trap, meaning that about 2% of the force applied on the bead in the moving trap is detected on the fixed trap. This effect should be considered when an accurate measurement of the absolute value of the force measurement is needed. In contrast to the interference effect, this direct crosstalk does not depend on laser power.

In conclusion, the rotation of polarization in double optical tweezers creates parasitic signals that should be taken care of, especially for applications that require high trap stiffness or high laser power.

Indeed, whereas the output voltage of the detector is commonly proportional to the force regardless of laser power, a given interference pattern generates a signal proportional to the laser power. Consequently, an important feature of this phenomena is that it is usually seen when laser power is high (i.e. 0.5 W or higher). For a low power trapping laser, parasitic signal still exists but may be hidden by noise.

The rectification of polarization enables us to decrease the crosstalk between the two traps, but not to annihilate it. We found that an even simpler and most effective method is to shift the frequency of one of the two beams. Even if crosstalk between the two traps is still occurring, it is small enough for most applications.

Figure 11:
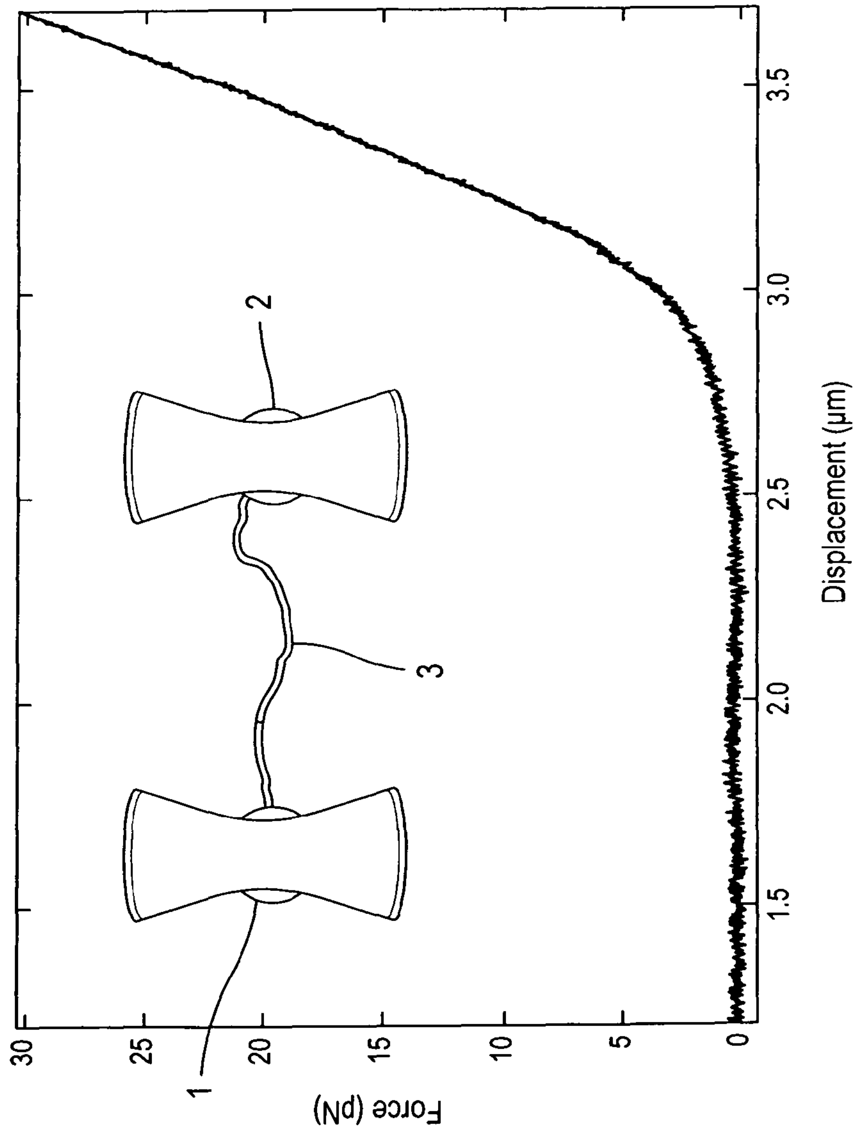
FIG. 11 shows force measurements on a single DNA molecule.
Figure 12:
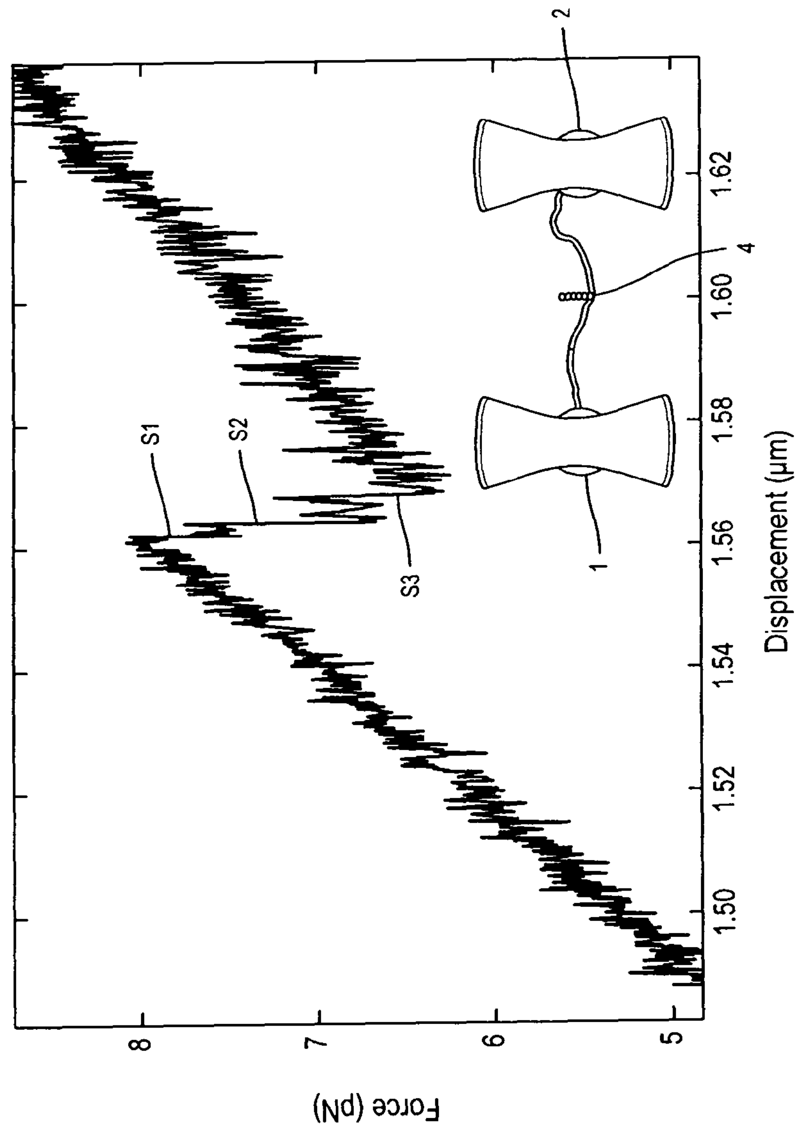
FIG. 12 shows force measurements of a force induced unfolding of a 173 nucleotide RNA fragment.

In reference to FIGS. 11 and 12, we are going to briefly describe two applications of the method and device according to the invention. For this, we have performed single molecule force measurements on DNA (3) and RNA (4) molecules in aqueous solution. In the former case as illustrated in FIG. 11, a DNA molecule (3) is extended and its mechanical response is measured. The DNA molecule (3) is, here, a 10000 basepair long DNA molecule attached between two beads (1, 2), as illustrated in the inset of FIG. 11. The two beads (1, 2) are hold in the double optical trap according to the invention. One trap (2) is displaced with respect to the other (1), thus extending the molecule, and force is determined from the displacement of the bead (1) in the immobile trap. The curve of the FIG. 11 shows the measurement of the obtained mechanical response.

In the latter case as illustrated in FIG. 12, the mechanical constraint is applied to a construction containing a folded RNA structure (4), as shown in the inset of FIG. 12. The folded RNA structure (4) comprises, here, a 173 nucleotide RNA fragment. The force versus displacement curve of FIG. 12, showing the force induced unfolding of this 173 nucleotide RNA fragment, here involves three major steps (S1, S2, S3), corresponding to the sudden force drops from about 8 to 7.5 pN (step S1), 7.5 to 6.7 pN (step S2) and 7 to 6.3 pN (step S3), respectively. Such features in force versus displacement curves reveal valuable informations on the DNA and RNA base sequences, including the stability and dynamics of local structures induced by base pairing. Reviews of the corresponding fields of applications can be found in the literature (see e.g. U. Bockelmann, Cur. Opin. Struct. Biol. 14, 368 (2004) and references therein). These two examples illustrate the technical performance and two possible applications of the invention, without restricting its general use.

The invention claimed is:

1. Method for reducing interference and crosstalk in a double optical tweezers apparatus for measuring forces applied to beads, comprising a single laser source, the method comprising the sequential steps of:

a. splitting the laser beam by polarization into a first laser beam and a second laser beam, a1. shifting the frequency of the first laser beam to a value different from the frequency of the second laser beam by a frequency shift, b. passing the first and second laser beams through a trapping objective and then through a condenser objective, c. reflecting one of the first and second laser beams so as to select a beam to be imaged, and d. imaging using back focal plane interferometry the selected laser beam on a position sensitive detector having a bandwidth smaller than the frequency shift.

2. Method according to claim 1, wherein, before step a, the laser beam is expanded, and, before step b, the first and second laser beams are steered.

3. Double optical tweezers apparatus for measuring forces applied to beads, comprising:

a single laser source;

a laser beam splitter for sequentially splitting a laser beam from the single laser beam source into a first laser beam and a second laser beam, wherein the laser beam splitter comprises an optic frequency shifter that shifts the first laser beam to a value different from the frequency of the second laser beam by a frequency shift;

a trapping means for passing the first and second laser beams through a trapping objective and then through a condenser objective;

a polarizer configured to select one of the first and second laser beams; and a position sensitive detector configured to image using back focal plane interferometry the selected laser beam, wherein the position sensitive detector has a bandwidth smaller than the frequency shift.

4. Apparatus according to claim 3, wherein, the splitter further comprises a piezoelectric tilt mirror, the optic frequency shifter is positioned before the piezoelectric mirror.

5. Apparatus according to claim 3 or 4, wherein the apparatus further comprises a beam expander and a beam steering.

* * * * *

UNITED STATES PATENT AND TRADEMARK OFFICE

CERTIFICATE OF CORRECTION

PATENT NO. : 9,035,235 B2
APPLICATION NO. : 13/055130
DATED : May 19, 2015
INVENTOR(S) : Ulrich Bockelmann and Pierre Mangeol It is certified that error appears in the above-identified patent and that said Letters Patent is hereby corrected as shown below:

Title Page

On Page 2, in Item [56], under Other Publications, at line 3, delete “3010” and insert --2010--

Signed and Sealed this
Eighth Day of March, 2016

Michelle K. Lee
*Director of the United States Patent and Trademark Office*